Patented June 15, 1937

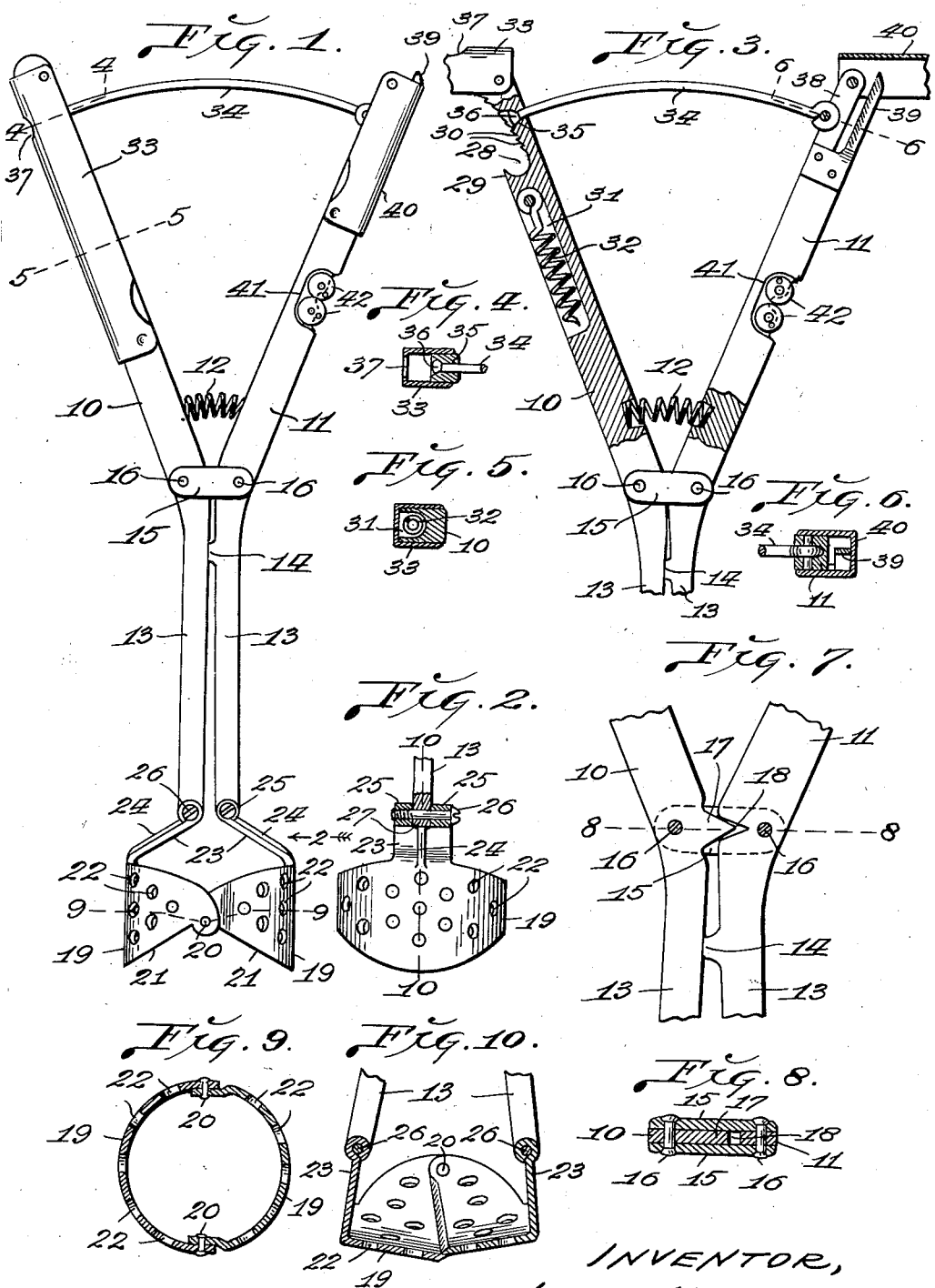

2,084,194

UNITED STATES PATENT OFFICE 2,084,194

FRUIT AND VEGETABLE CORE EXTRACTOR

Louis Frank, Los Angeles, Calif., assignor of one-half to Fred F. Malone, Los Angeles, Calif.

Application January 8, 1936, Serial No. 58,118

2 Claims. (Cl. 146—53)

My invention relates to a culinary utensil particularly designed for the cutting and extracting of cores from fruits and vegetables and said device also being constructed and equipped to function as a combination tool for use in performing certain operations such as the removal of corks from bottles, the opening of cans and for the sharpening of cutlery.

The principal object of my invention is, to provide a relatively simple, practical and inexpensive device that may be conveniently employed for the rapid and convenient cutting and removal of cores from fruits, vegetables and the like and the handle portions of the device being constructed and equipped with implements that may be used for opening bottles, for opening cans and for the sharpening of cutlery.

A further object of my invention is, to provide a utensil of the character referred to wherein an expansion fulcrum is provided between the pivot points of the handles in order that the ends of the handles that carry the cutting members may travel through arcs having much greater radii than if the handles were connected by a single pivot or fulcrum, thus enabling the sharpened edges of the cutters to move toward each other in a more direct line and to completely engage or pass one another so as to completely accomplish the cutting of the lower end of the core from the fruit or vegetable into which the cutters have been inserted.

A further object of my invention is, to generally improve upon and simplify the construction of the existing forms of implements utilized for cutting and extracting the cores of fruits and vegetables.

With the foregoing and other objects in view my invention consists in certain novel features of construction and arrangements of parts that will be hereinafter more fully described and claimed and illustrated in the accompanying drawing in which:

Fig. 1 is a side elevational view of a culinary utensil constructed in accordance with my invention.

Fig. 2 is an elevational view looking in the direction indicated by the arrow 2 in Fig. 1.

Fig. 3 in an elevational view of the handles of the utensil with parts thereof in section in order to more clearly illustrate the implements that are carried by the handles.

Fig. 4 is a cross section taken on the line 4—4 of Fig. 1.

Fig. 5 is a cross section taken on the line 5—5 of Fig. 1.

Fig. 6 is a cross section taken on the line 6—6 of Fig. 3.

Fig. 7 is an enlarged elevational view of the pivotal connections for the handles of the utensil and showing the expansion fulcrum between the pivots.

Fig. 8 is a horizontal sectional section taken on the line 8—8 of Fig. 7.

Fig. 9 is a horizontal section taken on the line 9—9 of Fig. 1.

Fig. 10 is a vertical section taken on the line 10—10 of Fig. 2.

Referring by numerals to the accompanying drawing 10 and 11 designate handles that are practically identical in form and which normally occupy diverging planes as illustrated in Figs. 1 and 3 and being yieldingly held in such position by an expansive spring 12 that is positioned between the lower portions of said handles.

Depending from the lower ends of said handles are arms 13 that are identical in form and which carry at their lower ends the cutting members as hereinafter more fully described.

Projecting from the inner edge of one of the arms 13 just below the point where the same are connected by the expansion fulcrum, is a lug 14 that functions as a stop to limit the movement of the arms 13 toward each other.

Positioned on the side faces of the lower portions of the handles 10, are plates 15 and passing through the end portions thereof and through the respective handles 10 and 11 are pins or rivets 16 that function as pivots for the handles and the arms 13 carried thereby.

Formed integral with and projecting from the inner edge of handle 10 at a point between the pivots 16, is a triangular lug 17 that engages in a substantially V-shaped notch 18 that is formed in handle 11.

The lug 17 positioned in the notch 18 provides an expansion fulcrum between the pivots 16 and which fulcrum acts when the handles are moved toward each other to permit the ends of the arms 13 to swing through arcs having greater radii than if said arms swung only on the pivots 16 and such action insures full closing movement between the sharpened edges of the cutting members carried by the lower ends of arms 13.

The cutting members carried by the lower ends of the arms 13 comprise semi-circular plates 19 of hard metal, the ends of which are pivotally connected to each other by pins or rivets 20 and the lower edges of both plates are beveled to provide cutting edges 21. In some instances as illustrated in Fig. 1, these cutting edges are formed so that they make direct contact with each other when the cutting members 19 are closed or as illustrated in Fig. 10 one member 19 may be slightly smaller than the other so that the cutting edges pass each other when the cutting members are closed, thus insuring the cutting of the core from the body of the fruit or vegetable.

The cutting members 19 are provided with perforations such as 22 in order to permit juices from the extracted core to drain through said cutting members and projecting upwardly and inwardly from the upper edges of the members 19, are inclined arms 23 that are reenforced with centrally arranged ribs 24.

The upper ends of these arms 23 are bifurcated and provided with loops 25, one loop of each pair being threaded for the reception of the threaded end of a screw 26 that passes through both loops.

The lower ends of the arms 33 are provided with loops 27 that are positioned between the loops 25 and the screws 26 pass through said loops 27, thereby pivotally mounting the cutting members on the lower ends of arms 13.

By using screws 26 for connecting the cutting members to the arms 13 different forms of cutting members may be interchangeably applied to the ends of the arms 13.

Formed in the outer edge of the upper portion of arm 10, is a notch 28 at the lower end of which is formed an upwardly and outwardly presented hook 29 that may be used for removing bottle caps and to engage and grip the bottle cap while the same is being removed, the face of notch 28 above the hook 29 is provided with teeth or corrugations 30.

Formed in the outer edge of arm 10, below notch 28, is a recess 31 for the reception of a corkscrew 32, the upper edge of which is pivotally connected to arm 10.

Pivotally connected to the upper end of arm 10 above the bottle cap remover is the upper end of a thin sheet metal cover 33, which is U-shape in horizontal section and which when in closed position as illustrated in Fig. 1, overlies the bottle cap remover and the corkscrew.

Pivotally connected to the upper portion of arm 11 is one end of a curved arm 34, the free end of which passes through an aperture 35 in the upper portion of arm 10 and the end of said arm beyond said aperture being provided with a head 36. This arm functions as a handle which may be grasped to enable the operator to more conveniently pull the implement upwardly when removing a core from a fruit or vegetable.

Then the handles 10 and 11 are moved toward each other to close the cutting members 19, arm 34 moves through the aperture 35 and through an aperture 37 that is formed in the outer upper portion of cover 33.

The upper portion of arm 11 is decreased in width to form a narrow finger 38 and secured to arm 11 below said finger, is a blade 39 that projects upwardly directly in front of said finger 38 and which blade may be utilized in opening cans.

Pivotally connected to the upper end of finger 38, is a thin sheet metal cover 40 which is substantially U-shape in cross section and which when in closed position as illustrated in Fig. 1, covers the can opener.

Formed in the outer edge of arm 11, below the can opener, is a recess 41 and rotatably mounted therein and arranged edge to edge, are two small hard metal discs 42 which may be used for sharpening cutlery and the like.

In the use of my improved core remover, the cutting members 19 carried by the lower ends of arms 13 and in open position as illustrated in Fig. 1, are forced downwardly into a fruit such as a grapefruit, orange, apple or the like or a vegetable such as a tomato, a head of cabbage or lettuce and after being inserted to the proper position the handles 10 and 11 are pressed together, thereby spreading the lower ends of arms 13 and as a result of such action the lower sharpened edges 21 of members 19, swing toward each other, thereby cutting the lower end of the core from the fruit or vegetable and the implement is now withdrawn from the fruit or vegetable with the core positioned between the members 19.

An especially desirable feature of my invention, is the provision of the expansion fulcrum between the pivots 16 for such fulcrum enables the arms to move longitudinally with respect to each other to a slight degree and thus insuring movement of the cutting members 19 so that the sharp edges thereof move into direct engagement with each other or past one another so that the lower end of the core is entirely cut from the body of the fruit or vegetable, which result enables the entire core to be readily removed without tearing any portion of the fruit or vegetable or of the removed core.

Thus it will be seen that I have provided a culinary utensil particularly designed for cutting and removing cores from fruits and vegetables and which implement is relatively simple in construction, inexpensive of manufacture and very effective in performing the functions for which it is intended.

It will be understood that minor changes in the size, form, and construction of the various parts of my improved fruit and vegetable core extractor may be made and substituted for those herein shown and described without departing from the spirit of the invention, the scope of which is set forth in the appended claims.

I claim as my invention:

1. In a culinary implement of the class described, a pair of pivotally connected handles, arms projecting from said handles, a pair of semicircular perforated plates having their ends pivotally connected, the lower edges of said plates being inclined and sharpened to form cutting edges, and arms projecting upwardly and inwardly toward each other from the upper central portions of said plates, the ends of which arms are pivotally connected to the ends of the arms that project from said handles.

2. In a culinary implement of the class described, a pair of handles, plates pivotally connecting the lower ends of said handles, one handle between said plates being provided with a V-shaped notch, the other handle being provided with a V-shaped tooth that enters said notch, the width of the opening into the notch being greater than the width of the intermediate portion of said tooth so that said tooth is free to rock for a limited distance in said notch as the handles are swung upon their pivots, arms projecting from the pivoted ends of said handles, and a pair of pivotally connected cutting members connected to said arms.

LOUIS FRANK.